(12) United States Patent
Wang et al.

(10) Patent No.: US 11,840,122 B2
(45) Date of Patent: Dec. 12, 2023

(54) THERMAL MANAGEMENT SYSTEM

(71) Applicant: HANGZHOU SANHUA RESEARCH INSTITUTE CO., LTD., Hangzhou (CN)

(72) Inventors: Kuiyang Wang, Hangzhou (CN); Qiaofeng Liu, Hangzhou (CN); Junqi Dong, Hangzhou (CN); Shiwei Jia, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 247 days.

(21) Appl. No.: 17/419,284

(22) PCT Filed: Sep. 16, 2020

(86) PCT No.: PCT/CN2020/115441
§ 371 (c)(1),
(2) Date: Jun. 28, 2021

(87) PCT Pub. No.: WO2021/052341
PCT Pub. Date: Mar. 25, 2021

(65) Prior Publication Data
US 2022/0072927 A1  Mar. 10, 2022

(30) Foreign Application Priority Data
Sep. 16, 2019 (CN) .......................... 201910870675.4

(51) Int. Cl.
*F25B 13/00* (2006.01)
*B60H 1/00* (2006.01)
(Continued)

(52) U.S. Cl.
CPC ......... *B60H 1/00278* (2013.01); *B60H 1/034* (2013.01); *H01M 10/613* (2015.04);
(Continued)

(58) Field of Classification Search
CPC . B60H 1/00278; B60H 1/034; H01M 10/013; H01M 10/625; H01M 10/6569; H01M 2220/20
(Continued)

(56) References Cited

U.S. PATENT DOCUMENTS

2018/0117985 A1   5/2018  Kim et al.

FOREIGN PATENT DOCUMENTS

| CN | 101378923 A | 3/2009 |
| CN | 104169556 A | 11/2014 |

(Continued)

*Primary Examiner* — Davis D Hwu
(74) *Attorney, Agent, or Firm* — Cheng-Ju Chiang

(57) ABSTRACT

A thermal management system includes a cooling liquid circulation flow path, a refrigerant circulation flow path and a first heat exchanger. The first heat exchanger includes a first heat exchange portion and a second heat exchange portion. The cooling liquid circulation flow path includes a first heat exchange assembly, a second heat exchange assembly and a first branch. The thermal management system has a heating mode. After passing through the first heat exchange assembly, one path of the cooling liquid flows to the first branch, and another path of the cooling liquid flows to the second heat exchange assembly. The cooling liquid after flowing through the first branch and after flowing through the second heat exchange assembly merge and then flow to the first heat exchange portion. As a result, the number of heat exchangers used by the thermal management system to recover waste heat is reduced.

19 Claims, 3 Drawing Sheets

(51) Int. Cl.
    *H01M 10/613*     (2014.01)
    *H01M 10/625*     (2014.01)
    *H01M 10/6568*     (2014.01)
    *B60H 1/03*     (2006.01)

(52) U.S. Cl.
    CPC ..... *H01M 10/625* (2015.04); *H01M 10/6568* (2015.04); *H01M 2220/20* (2013.01)

(58) Field of Classification Search
    USPC .......................................................... 62/160
    See application file for complete search history.

(56) References Cited

FOREIGN PATENT DOCUMENTS

| | | | |
|---|---|---|---|
| CN | 105655667 A | | 6/2016 |
| CN | 105121192 B | * | 12/2017 |
| CN | 207800847 U | | 8/2018 |
| CN | 108705915 A | | 10/2018 |
| CN | 109774409 A | | 5/2019 |
| CN | 109974318 A | | 7/2019 |
| CN | 110103665 A | | 8/2019 |
| CN | 209274301 U | | 8/2019 |
| CN | 209381733 U | | 9/2019 |
| DE | 102010013000 A1 | | 9/2011 |
| DE | 102012108043 A1 | | 5/2014 |
| EP | 2327575 A1 | | 6/2011 |
| EP | 3069912 A1 | | 9/2016 |
| JP | 2017-52506 A | | 3/2017 |
| WO | 2018/155886 A1 | | 8/2018 |
| WO | 2018/161907 A1 | | 9/2018 |

* cited by examiner

THERMAL MANAGEMENT SYSTEM

CROSS-REFERENCE TO RELATED APPLICATION

This application is a 35 U.S.C. § 371 National Phase conversion of International (PCT) Patent Application No. PCT/CN2020/115441, filed on Sep. 16, 2020, which requires a priority of a Chinese Patent Application No. 201910870675.4, filed on Sep. 16, 2019 and titled "THERMAL MANAGEMENT SYSTEM", the entire content of which is incorporated into this application herein by reference. The PCT International Patent Application was filed and published in Chinese.

TECHNICAL FIELD

The present disclosure relates to a field of thermal management technology, and in particular to a thermal management system.

BACKGROUND

A thermal management system of a vehicle can realize cooling, heating, ventilation and air purification of the air in a vehicle compartment. When relevant thermal management system is heating, its refrigerant flow path can use excess heat generated by a motor or a battery etc., through a heat exchanger. However, components which can generate excess heat often have different working temperature requirements, so it is necessary to set corresponding heat exchangers to recover the excess heat generated by each component. Therefore, this leads to a large number of heat exchangers used for waste heat recovery in the thermal management system.

SUMMARY

In view of the above-mentioned problem, the present disclosure provides a thermal management system in order to reduce the number of heat exchangers used by the thermal management system for waste heat recovery.

In order to achieve the above object, the present disclosure adopts the following technical solution:

a thermal management system, including: a cooling liquid circulation flow path and a refrigerant circulation flow path; the thermal management system including a first heat exchanger, the first heat exchanger including a first heat exchange portion and a second heat exchange portion which are capable of exchanging heat, a flow path of the first heat exchange portion being capable of communicating with the cooling liquid circulation flow path, a flow path of the second heat exchange portion being capable of communicating with the refrigerant circulation flow path, the cooling liquid circulation flow path including a first heat exchange assembly, a second heat exchange assembly and a first branch;

the thermal management system includes a heating mode in which the refrigerant circulation flow path is communicated to form a loop; the first heat exchange assembly, the second heat exchange assembly and the first heat exchange portion are communicated to form a loop; the first heat exchange assembly, the first branch and the first heat exchange portion are communicated to form a loop; after the cooling liquid passing through the first heat exchange assembly, one path of the cooling liquid flows to the first branch, and another path of the cooling liquid flows to the second heat exchange assembly; the cooling liquid after flowing through the first branch and the cooling liquid after flowing through the second heat exchange assembly merge and then flow to the first heat exchange portion, and heat of the cooling liquid circulation flow path is transferred to the refrigerant circulation flow path through the first heat exchanger.

A thermal management system, including:
a refrigerant system including a compressor, a first indoor heat exchanger, a second indoor heat exchanger, an outdoor heat exchanger and a throttling device;
a cooling liquid system including a first pump, a first heat exchange assembly and a second heat exchange assembly;
a first dual-flow heat exchanger including a first heat exchange portion and a second heat exchange portion which are not communicated;
the thermal management system including a heating mode, and in the heating mode:
the refrigerant system communicates with the second heat exchange portion to form a refrigerant circuit, an outlet of the compressor is in communication with an inlet of the first indoor heat exchanger, an outlet of the first indoor heat exchanger is in communication with at least one of a first port of the outdoor heat exchanger and an inlet of the second heat exchange portion, an outlet of the second heat exchange portion is in communication with an inlet of the compressor, and a second port of the outdoor heat exchanger is in communication with the inlet of the compressor;
the throttling device is communicated between the outlet of the first indoor heat exchanger and the first port of the outdoor heat exchanger; and/or, the throttling device is communicated between the outlet of the first indoor heat exchanger and the inlet of the second heat exchange portion;
the cooling liquid system communicates with the first heat exchange portion to form a cooling liquid circuit, the cooling liquid system includes a first branch, the first heat exchange assembly is in communication with a first pump, and at least one of the second heat exchange assembly and the first branch is in communication with the first pump and the first heat exchange portion.

A thermal management system, including:
a compressor, a first indoor heat exchanger, a second indoor heat exchanger, an outdoor heat exchanger, a first throttling device, a second throttling device;
a first pump, a first heat exchange assembly and a second heat exchange assembly;
a first dual-flow heat exchanger including a first heat exchange portion and a second heat exchange portion which are not communicated;
wherein the thermal management system includes a heating mode, and in the heating mode:
an outlet of the compressor is in communication with an inlet of the first indoor heat exchanger, an outlet of the first indoor heat exchanger is in communication with at least one of a first port of the outdoor heat exchanger and an inlet of the second heat exchange portion, an outlet of the second heat exchange portion is in communication with an inlet of the compressor, a second port of the outdoor heat exchanger is in communication with the inlet of the compressor, the first throttling device is communicated between the outlet of the first indoor heat exchanger and the first port of the outdoor heat exchanger, the second throttling device is communicated between the outlet of the first indoor heat exchanger and the inlet of the second heat exchange portion;
the thermal management system further includes a first branch, the first heat exchange assembly is in communication with a first pump, and at least one of the second heat exchange assembly and the first branch is in communication with the first pump and the first heat exchange portion.

It can be seen from the above technical solutions that the cooling liquid circulation flow path disclosed in the present disclosure includes the first heat exchange assembly, the second heat exchange assembly and the first branch. In the heating mode, the first heat exchange assembly, the second heat exchange assembly and the first heat exchange portion are communicated to form a loop; the first heat exchange assembly, the first branch and the first heat exchange portion are communicated to form a loop; after the cooling liquid passing through the first heat exchange assembly, one path of the cooling liquid flows to the first branch, and another path of the cooling liquid flows to the second heat exchange assembly; and the two paths of the cooling liquid merge and then flow to the first heat exchange portion. As a result, the number of heat exchangers used by the thermal management system for waste heat recovery can be reduced.

DETAILED DESCRIPTION

Figure 1:
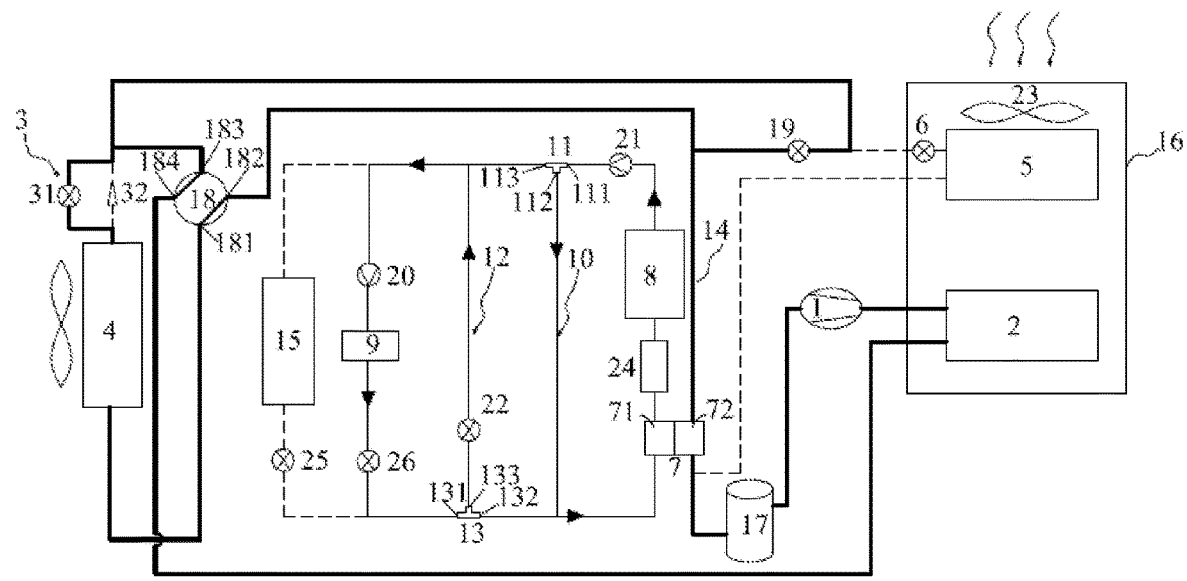
FIG. 1 is a schematic view of a principle of a heating mode in accordance with an exemplary embodiment of the present disclosure.

Embodiments of the present disclosure are described in detail below, and examples of the embodiments are shown in drawings. When the following description refers to the drawings, unless otherwise indicated, the same numbers in different drawings indicate the same or similar elements. The embodiments described in the following exemplary embodiments do not represent all embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

It should be understood that "first", "second" and similar words used in the specification and claims of the present disclosure do not denote any order, quantity or importance, but are only used to distinguish different components. Similarly, similar words such as "a" or "an" do not mean a quantity limit, but mean that there is at least one. A phrase such as "a plurality of" means two or more than two. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

A thermal management system disclosed in the present disclosure can be applied to an automotive thermal management system, for example, an electric automotive air conditioning system, and can also be applied to other thermal management systems such as a vehicle thermal management system or a commercial thermal management system. In the following, specific automotive thermal management systems are taken as an example for description in conjunction with the accompanying drawings. In the case of no conflict, the following embodiments and features in the embodiments can be mutually supplemented or combined with each other.

Referring to FIGS. 1 to 5, the thermal management system includes a cooling liquid circulation flow path and a refrigerant circulation flow path. The cooling liquid circulation flow path and the refrigerant circulation flow path are isolated from each other and not communicated. The thermal management system further includes a first heat exchanger 7. The first heat exchanger/first dual-flow heat exchanger 7 includes a first heat exchange portion 71 and a second heat exchange portion 72. A flow channel of the first heat exchange portion 71 and a flow channel of the second heat exchange portion 72 are isolated from each other and not communicated. The flow path of the first heat exchange portion 71 is communicated with the cooling liquid circulation flow path. The flow path of the second heat exchange portion 72 is communicated with the refrigerant circulation flow path. That is, the flow path of the first heat exchange portion 71 is a part of the cooling liquid circulation flow path, and the flow path of the second heat exchange portion 72 is a part of the refrigerant circulation flow path. The cooling liquid flowing through the first heat exchange portion 71 and the refrigerant after flowing through the second heat exchange portion 72 can exchange heat in the first heat exchanger/first dual-flow heat exchanger 7. Among them, the cooling liquid may be a mixed liquid of water and ethanol. The refrigerant may be a heat exchange medium such as $CO_2$. The thermal management system further includes a first heat exchange assembly 8 and a second heat exchange assembly 9. The first heat exchange assembly 8 includes a battery. The first heat exchange assembly 8 can transfer the excess heat generated by the battery to the cooling liquid, and can also transfer the heat of the cooling liquid to the battery. The second heat exchange assembly 9 includes components such as a motor and an inverter. The second heat exchange assembly 9 can transfer the excess heat generated by the motor and other components to the cooling liquid, and can also transfer the heat of the cooling liquid to the motor and other components. The first heat exchange assembly 8 and the second heat exchange assembly 9 can transfer heat to the cooling liquid differently. Therefore, when the cooling liquid passes through the first heat exchange assembly 8 and the second heat exchange assembly 9, respective temperature changes are also different.

As shown in FIG. 1, thick solid line parts are the flow paths of the refrigerant, and thin solid line parts are the flow paths of the cooling liquid. The refrigerant circulation flow path includes a compressor 1, a first indoor heat exchanger 2, a first regulating device 3, an outdoor heat exchanger 4 and a third branch 14. An outlet of the compressor 1 and an inlet of the first indoor heat exchanger 2 are connected by pipelines. An outlet of the first indoor heat exchanger 2 and a first port of the first regulating device 3 are connected by a pipeline. A second port of the first regulating device 3 and a first port of the outdoor heat exchanger 4 are connected by a pipeline. A second port of the outdoor heat exchanger 4 and an inlet of the second heat exchange portion 72 are connected by a pipeline. One end of the third branch 14 is connected to the outlet of the first indoor heat exchanger 2 through a pipeline. The other end of the third branch 14 is connected to the inlet of the second heat exchange portion 72. The pipeline connecting the outdoor heat exchanger 4 and the second heat exchange portion 72 may be provided with a connecting fulcrum with the third branch 14 as a confluence point. In this way, the refrigerant can be divided into two paths after passing through the first indoor heat exchanger 2, in which one path of the refrigerant flows to the third branch 14 and another path of the refrigerant flows to the first regulating device 3. In other embodiments, the second heat exchange portion 72 may be provided with two inlets, in which one inlet is communicated with the third branch 14, and the outdoor heat exchanger 4 is directly communicated with the other inlet of the second heat exchange portion 72 through a pipeline.

The cooling liquid circulation flow path includes a first pump 21, a first heat exchange assembly 8, a second heat exchange assembly 9 and a first branch 10. The first heat exchange assembly 8 and the first heat exchange portion 71 are connected in series via a pipeline. The first heat exchange assembly 8 is connected to the first branch 10 and the second heat exchange assembly 9 via pipelines. One end of the first branch 10 can communicate with an outlet of the first heat exchange assembly 8. The other end of the first branch path 10 can communicate with the inlet of the second heat exchange portion 72. A first port of the second heat exchange assembly 9 can communicate with an outlet of the first heat exchange assembly 8. A second port of the second heat exchange assembly 9 can communicate with an outlet of the first heat exchange portion 71. The first pump 21 may be connected to the pipeline between the first heat exchange assembly 8 and the first heat exchange portion 71, or may be connected to the pipeline between the first heat exchange assembly 8 and the second heat exchange assembly 9. The first pump 21 is used to drive the cooling liquid to flow from the first heat exchange assembly 8 to the second heat exchange assembly 9. The cooling liquid circulation flow path can also be connected with a pressure water tank (not shown in the figure), which is used to inject more cooling liquid into the cooling liquid circulation flow path, increase the flow rate or increase the injection volume.

The thermal management system of the present disclosure includes a heating mode, which can be used to heat the environment in a vehicle compartment when the external environment temperature is low in winter. In the heating mode, the compressor 1, the first indoor heat exchanger 2, the first regulating device 3, the outdoor heat exchanger 4 and the second heat exchange unit 72 are communicated to form a loop. And, the compressor 1, the first indoor heat exchanger 2, the third branch 14, and the second heat exchange portion 72 are communicated to form a loop. The refrigerant is divided into two flow paths after passing through the first indoor heat exchanger 2, wherein one path flows to the third branch 14 and another path flows to the first regulating device 3. The refrigerant flows to the second heat exchange portion 72 after passing through the outdoor heat exchanger 4. The refrigerant flows to the second heat exchange portion 72 through the third branch 14. The refrigerant after flowing through the outdoor heat exchanger 4 merges with the refrigerant in the third branch 14 and then flows to the second heat exchange portion 72. In other embodiments, the refrigerant after flowing through the outdoor heat exchanger 4 and the refrigerant in the third branch 14 may respectively flow to the second heat exchange portion 72. In other embodiments, the refrigerant after flowing through the outdoor heat exchanger 4 may not pass through the second heat exchange portion 72 but directly returns to the compressor 1.

In the cooling liquid circulation flow path, the first heat exchange assembly 8, the second heat exchange assembly 9 and the first heat exchange portion 71 are communicated to form a loop. And, the first heat exchange assembly 8, the first branch 10 and the first heat exchange portion 71 are communicated to form a loop. After passing through the first heat exchange assembly 8, one path of the cooling liquid flows to the first branch 10 and another path of the cooling liquid flows to the second heat exchange assembly 9. The two paths of the cooling liquid merge and then flow to the first heat exchange portion 71. The heat of the cooling liquid circulation flow path is transferred to the refrigerant circulation flow path through the first heat exchanger 7. When the cooling liquid passes through the motor, the temperature will change further.

In the heating mode, the working principle of the refrigerant circulation flow path is as follows: the refrigerant is compressed by the compressor 1 into a gaseous state of high temperature and high pressure. When the refrigerant passes through the first indoor heat exchanger 2, the first indoor heat exchanger 2 is used as a condenser, and the refrigerant releases heat. The thermal management system can regulate the indoor environment temperature. The thermal management system further includes an air duct 16 and a blower 23. The blower 23 sends air into the air duct 16. The first indoor heat exchanger 2 is located in the air duct 16. When the air in the air duct 16 passes through the first indoor heat exchanger 2, it exchanges heat with the refrigerant, and the air is heated and blown into the vehicle compartment. After the cooled refrigerant enters the first regulating device 3 for throttling, the temperature of the refrigerant decreases again, so that the refrigerant becomes a low-temperature and low-pressure state. The low-temperature and low-pressure refrigerant enters the outdoor heat exchanger 4, exchanges heat with the external environment through the outdoor heat exchanger 4, and absorbs heat from the external environment. The low-temperature and low-pressure refrigerant entering the third branch 14 merges with the low-temperature and low-pressure refrigerant after passing through the outdoor heat exchanger 4, then flows to the second heat exchange portion 72. The refrigerant absorbs the heat of the cooling liquid flowing into the first heat exchange portion 71 through the second heat exchange portion 72, and then returns to the compressor 1 to be compressed again. In other embodiments, it is also possible that only the refrigerant in the third branch 14 passes through the second heat exchange portion 72 of the first heat exchanger 7 to participate in absorbing the excess heat of the cooling liquid circulation flow path. Finally, the refrigerant after passing through the second heat exchange portion 72 merges with the refrigerant not passing through the second heat exchange portion 72, and then returns to the compressor 1. A loop is formed by circulating like this.

In this embodiment, the refrigerant circulation flow path further includes a gas-liquid separator 17. The refrigerant returns to the compressor 1 after passing through the gas-liquid separator 17. In other embodiments, the gas-liquid separator 17 may be provided with two pipeline connection inlets for communicating with two paths of refrigerant, respectively. The two paths of refrigerant flow into the gas-liquid separator 17 at the same time. It is also possible that the gas-liquid separator 17 has only one connection inlet. The two paths of refrigerant merge first and then flow into the gas-liquid separator 17. After the refrigerant is separated into gas and liquid in the gas-liquid separator 17, the gas refrigerant returns to the compressor 1 and is compressed again. In other embodiments, the refrigerant flow path may not include the gas-liquid separator 17. For example, the refrigerant is in a gas state rather than a two-phase gas-liquid state before entering the compressor 1, or the compressor 1 has a gas-liquid separation function. In other embodiments, the two paths of refrigerant may not merge, but respectively flows to the gas-liquid separator 17 and enters the gas-liquid separator 17 at the same time. If the thermal management system does not include the gas-liquid separator 17, the two paths of refrigerant can also respectively flow to the compressor 1 and enter the compressor 1 at the same time.

In this embodiment, the refrigerant circulation flow path further includes a flow path regulating device 18. The flow path regulating device 18 is a four-way valve which includes a first connection port 181, a second connection port 182, a third connection port 183 and a fourth connection port 184. The first connection port 181 may be communicated with the second connection port 182 or may be communicated with the fourth connection port 184. The third connection port 183 may be communicated with the second connection port 182 or may be communicated with the fourth connection port 184. The first connection port 181 of the flow path regulating device 18 can communicate with the outdoor heat exchanger 4. The second connection port 182 can communicate with the inlet of the second heat exchange portion 72. Both the first port of the first regulating device 3 and the third branch 14 can communicate with the third connection port 183. The fourth connection port 184 can communicate with the outlet of the second heat exchanger 2. The flow path regulating device 18 includes a first working state and a second working state. In the first working state, the first connection port 181 is in communication with the second connection port 182, and the third connection port 183 is in communication with the fourth connection port 184. In the second working state, the first connection port 181 is in communication with the fourth connection port 184, and the second connection port 182 is not in communication with the third connection port 183. In the heating mode, the flow path regulating device 18 is in the first working state. The refrigerant flows into the fourth connection port 184 of the flow path regulating device 18 from the outlet of the first indoor heat exchanger 2 and flows out from the third connection port 183 of the flow path regulating device 18. The refrigerant is divided into two paths after flowing out of the third connection port 183, one path of the refrigerant flows to the first port of the first regulating device 3 and another path of the refrigerant flows to the third branch 14; and, after the refrigerant passes through the outdoor heat exchanger 4, the refrigerant flows to the second heat exchange portion 72 via the flow regulating device 18.

In this embodiment, the refrigerant circulation flow path further includes a third regulating device 19. The third regulating device 19 is connected to the third branch 14. The third regulating device 19 may have a conducting state, a throttling state and a blocking state, so that it may have the functions of conducting the third branch 14, blocking the third branch 14 and throttling the refrigerant fluid on the third branch 14. In heating mode, when the temperature of the cooling liquid is high, for example, the temperature of the cooling liquid is higher than 20° C. (the temperature can be between 15° C. and 25° C., or can also be set according to the actual working temperature required by the cooling liquid), the third regulating device 19 is in the throttling state. The refrigerant is throttled and cooled by the third regulating device 19, so that the temperature of the refrigerant is lowered before entering the second heat exchange portion 72, and more heat of the cooling liquid can be absorbed. When the temperature of the cooling liquid is lower than 20° C., the temperature is relatively low, and the working temperature of the battery needs to be maintained. Therefore, the third regulating device 19 is in the conducting state, and the state does not change when the refrigerant passes through the third regulating device 19. In other embodiments, the third regulating device 19 can also block the third branch 14 so that the refrigerant does not flow into the second heat exchange portion 72 through the third branch 14.

In the heating mode, the working principle of the cooling liquid circulation flow path is as follows: the first pump 21 is activated, and the cooling liquid after passing through the first heat exchange assembly 8 is divided into two paths, in which one path of the cooling liquid flows to the second heat exchange assembly 9 and another path of the cooling liquid flows to the first branch 10. When the first heat exchange assembly 8 includes a battery and the second heat exchange assembly 9 includes a motor, the working temperature of the motor is higher and the battery requires a lower working temperature. Therefore, the cooling liquid will be heated after passing through the second heat exchange assembly 9. This part of the high-temperature cooling liquid is mixed with the relatively low-temperature cooling liquid after passing through the first branch 10 so as to form a cooling liquid with a suitable temperature. When the cooling liquid in this state passes through the first heat exchange portion 71, it exchanges heat with the refrigerant passing through the second heat exchange portion 72, the cooling liquid transfers heat to the refrigerant and the cooling liquid cools down. When the cooled cooling liquid enters the first heat exchange assembly 8, it just reaches the working temperature required by the battery.

It should be noted that the function of the first branch 10 is to divide and flow part of the cooling liquid, so that part of the cooling liquid is not heated into a high temperature cooling liquid because it does not pass through the motor. As a result, two flows of cooling liquid at a relatively low temperature and a relatively high temperature are formed, which reduces the temperature of the cooling liquid flowing to the first heat exchange portion 71 and reduces the possibility that the temperature of the cooling liquid after exchanging heat with the refrigerant is still higher than the working temperature required by the battery. The temperature of the cooling liquid entering the first heat exchange assembly 8 is controlled within an appropriate range. In this way, a temperature regulating mechanism of the cooling liquid circulation flow path itself is formed. In the heating mode, the refrigerant absorbs the heat of the cooling liquid to recycle the excess heat generated by the first heat exchange assembly 8 and the second heat exchange assembly 9, so as to improve the heating capacity while also adjusting the working temperature of the battery. In other embodiments, when the heating capacity of the thermal management system does not need to be improved, the cooling liquid circulation flow path may not work.

In the heating mode, the first heat exchange assembly 8, the second heat exchange assembly 9 and the first heat exchange portion 71 are communicated to form a loop. The first heat exchange assembly 8, the first branch 10 and the first heat exchange portion 71 are communicated to form a loop. After passing through the first heat exchange assembly 8, one path of the cooling liquid flows to the first branch 10 and another path of the cooling liquid flows to the second heat exchange assembly 9. The two paths of the cooling liquid merge and then flow to the first heat exchange portion 71, which can reduce the number of heat exchangers used by the heat management system for waste heat recovery.

In this embodiment, the cooling liquid circulation flow path further includes a first flow regulating device 11. The first flow regulating device 11 includes a first port 111, a second port 112 and a third port 113. The first port 111 can be connected to the first heat exchange assembly 8 through a pipeline. The second port 112 is connected to the first branch 10 through a pipeline. The third port 113 is connected to the second heat exchange assembly 9. In the heating mode, both the second port 112 and the third port 113 are in communication with the first port 111. The cooling liquid is divided by the first flow regulating device 11 after flowing through the first heat exchange assembly 8. The first flow regulating device 11 is a three-way proportional regulating valve, which can regulate the flow of cooling liquid entering the first branch 10 and flowing to the second heat exchange assembly 9. When more cooling liquid enters the first branch 10, it means that the high-temperature cooling liquid after passing through the second heat exchange assembly 9 is lowered more after being mixed with the relatively low-temperature cooling liquid passing through the first branch 10. Therefore, the first flow regulating device 11 can also adjust the temperature of the cooling liquid entering the first heat exchange assembly 8 so as to meet the working temperature required by the battery.

In this embodiment, the cooling liquid circulation flow path further includes a second branch 12. In the heating mode, the second branch 12 and the second heat exchange assembly 9 are communicated to form a loop. After passing through the second heat exchange assembly 9, one path of the cooling liquid flows to the second branch 12, and another path of the cooling liquid flows to the first heat exchange portion 71. A first control valve 22 is provided on the second branch 12 to facilitate switching on or off of the second branch 12. It can be understood that the second branch 12 can divide the cooling liquid passing through the second heat exchange assembly 9. Therefore, less high-temperature cooling liquid is mixed with the relatively low-temperature cooling liquid in the first branch 10, so that the temperature of the cooling liquid before entering the first heat exchange assembly 8 is not too high. At the same time, part of the high-temperature cooling liquid flows back to the second heat exchange assembly 9 and only part of the heat is recovered, which ensures the required working temperature of the motor. The second branch 12 can be switched on or off by the first control valve 22 according to actual conditions, so as to adjust the temperature of the cooling liquid circulation flow path.

In this embodiment, the cooling liquid circulation flow path further includes a second flow regulating device 13. The second flow regulating device 13 includes a fourth port 131, a fifth port 132 and a sixth port 133. The fourth port 131 and the second heat exchange assembly 9 are connected by a pipeline. The fifth port 132 and the first heat exchange portion 71 are connected by a pipeline. One end of the first branch 10 can be connected to the fifth port 132 and the first heat exchange portion 71 through a pipeline. The sixth port 133 is connected to the second branch 12 through a pipeline. In the heating mode, the fifth port 132 and the sixth port 133 are both in communication with the fourth port 131. The cooling liquid is divided by the second flow regulating device 13 after passing through the second heat exchange assembly 9. The second flow regulating device 13 is a proportional regulating valve which is used to regulate the cooling liquid flow to the second branch 12 and to the first heat exchange portion 71, so that the thermal management system can better regulate the working temperatures of the motor and the battery. It should be noted that the regulating functions of the first branch 10 and the second branch 12 are affected by the amount of injected cooling liquid. Therefore, a pressure water tank can be connected to the cooling liquid circulation flow path to adjust the amount of the injected cooling liquid. The flow rate distribution is performed by the first flow regulating device 11 and the second flow regulating device 13. The cooling liquid circulation flow path in this embodiment further includes a third control valve 26. The third control valve 26 is connected to the pipeline between the second heat exchange assembly 9 and the second flow regulating device 13, so that it is more convenient to control the communication of the pipeline. In other embodiments, the third control valve 26 may also be connected to the pipeline between the second heat exchange assembly 9 and the first flow regulating device 11.

Figure 2:
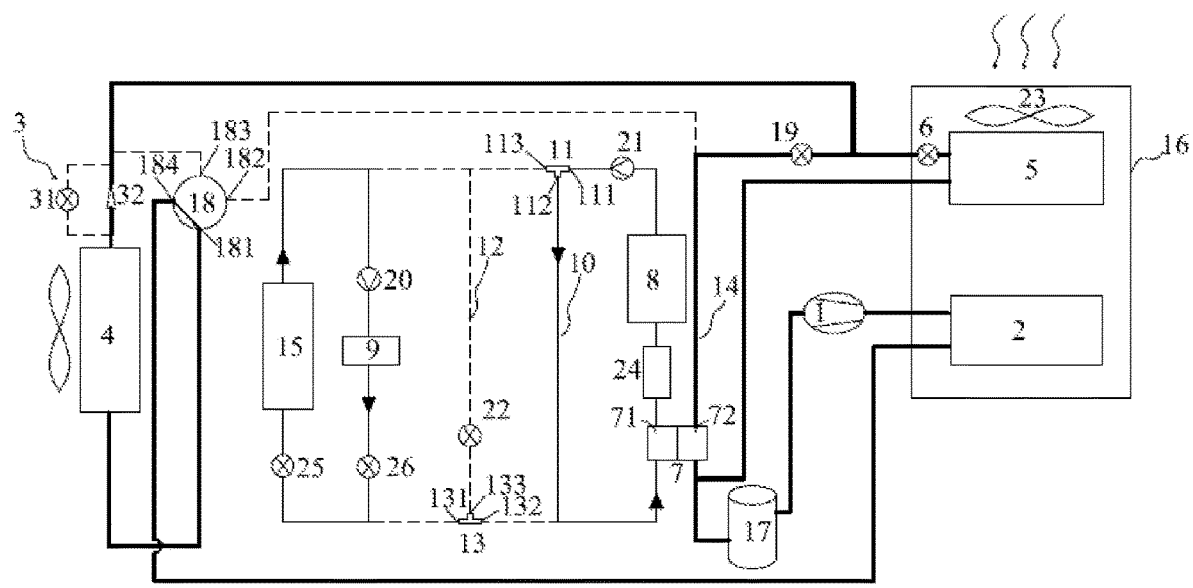
FIG. 2 is a schematic view of a principle of a first working mode of a cooling mode in accordance with an exemplary embodiment of the present disclosure.
Figure 3:
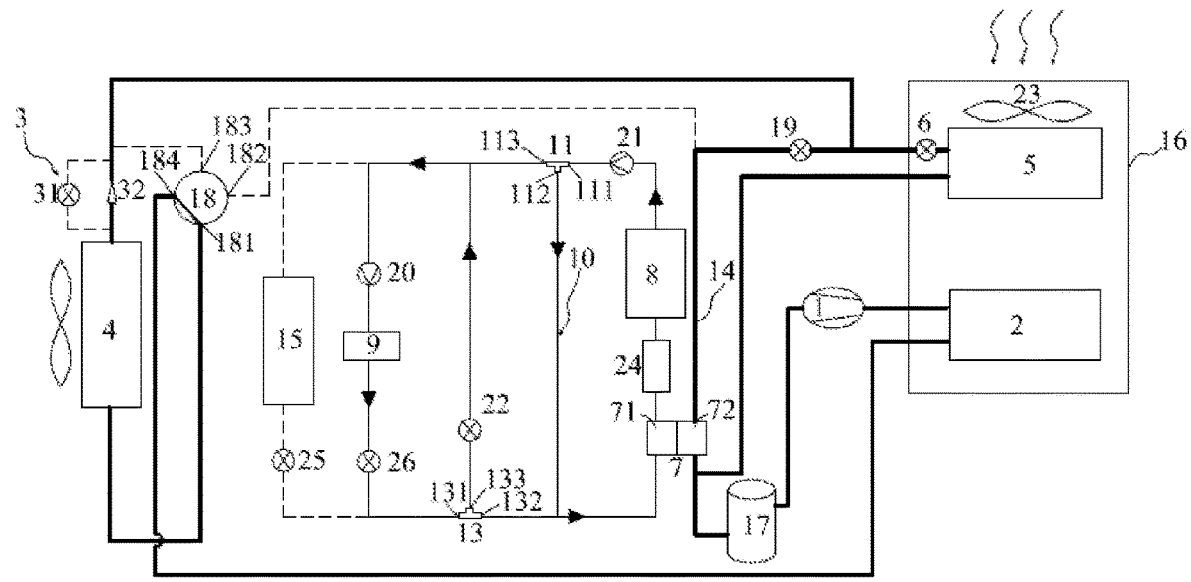
FIG. 3 is a schematic view of a principle of a second working mode of a cooling mode in accordance with an exemplary embodiment of the present disclosure.

As shown in FIGS. 2 and 3, the refrigerant circulation flow path further includes a second indoor heat exchanger 5 and a second regulating device 6. An outlet of the second regulating device 6 can communicate with an inlet of the second indoor heat exchanger 5 for throttling the refrigerant before entering the second indoor heat exchanger 5. The cooling liquid circulation flow path further includes a second heat exchanger 15, a second control valve 25, a third control valve 26 and a second pump 20. The second heat exchanger 15 may be a heat dissipation water tank or an air heat exchanger. The second pump 20 is disposed on the pipeline between the second heat exchange assembly 9 and the second heat exchanger 15. The second control valve 25 is connected to an outlet of the second heat exchanger 15. The third control valve 26 is connected to an outlet of the second heat exchange assembly 9. In the heating mode, the third control valve 26 is opened, the second control valve 25 is closed, and the second pump 20 can be opened or closed. The thermal management system further includes a cooling mode. In this embodiment, the cooling mode includes a first working mode and a second working mode.

The first working mode is used to cool the environment in the vehicle compartment when the external environment temperature is high in summer, and at the same time, it can also dissipate the motor and the battery. As shown in FIG. 2, thick solid line parts are the flow paths of the refrigerant, and thin solid line parts are the flow paths of the cooling liquid. In the first working mode: the compressor 1, the first indoor heat exchanger 2, the flow path regulating device 18, the outdoor heat exchanger 4, the first regulating device 3, the second regulating device 6, the second indoor heat exchanger 5 and the gas-liquid separator 17 are communicated to form a loop. And, the compressor 1, the first indoor heat exchanger 2, the flow path regulating device 18, the outdoor heat exchanger 4, the first regulating device 3, the third branch 14 and the second heat exchange portion 72 are communicated to form a loop. The refrigerant is divided after passing through the first regulating device 3, in which one path of the refrigerant flows to the third branch 14 and another path of the refrigerant flows to the second indoor heat exchanger 5. In other embodiments, the refrigerant may not pass through the first regulating device 3, and the refrigerant may be directly divided after passing through the outdoor heat exchanger 4. In this embodiment, the first regulating device 3 is in the on state at this time, and it has multiple functions for switching among different modes. It can be understood that the first regulating device 3 may be a valve member which has both a conducting function and a throttling function. The first regulating device 3 may also be a combined valve of at least two valve parts. In this embodiment, the first regulating device 3 is a combined valve which includes a throttle unit valve 31 and a conduction unit valve 32. The conduction unit valve 32 may be a check valve or a two-way control valve. In the cooling mode, the throttle unit valve 31 is closed and the conduction unit valve 32 is opened, in order to realize one-way flowing of refrigerant. In other words, the refrigerant flows from the outdoor heat exchanger 4 to the conduction unit valve 32, and then flows to the second heat exchange portion 72 after passing through the conduction unit valve 32. In the cooling mode, the flow path regulating device 18 is in the second working state.

In the first working mode, the working principle of the refrigerant circulation flow path is as follows: the refrigerant is compressed by the compressor 1 into a high-temperature and high-pressure gaseous state. The high-temperature and high-pressure gaseous refrigerant passes through the first indoor heat exchanger 2 without heat exchange. For example, the air can be blocked from passing through the first indoor heat exchanger 2 by a damper. The high-temperature and high-pressure gaseous refrigerant exchanges heat with the external environment through the outdoor heat exchanger 4. The outdoor heat exchanger 4 is used as a condenser. After the refrigerant releases heat, the temperature is lowered, and the refrigerant passes through the conduction unit valve 32 of the first regulating device 3 and then is divided into two flow paths. The state of the refrigerant in the conduction unit valve 32 does not change. Before the low-temperature refrigerant enters the second heat exchange portion 72, the third regulating device 19 may be selected to throttle and reduce the temperature of the refrigerant circulation flow path, or it may not be throttled. The purpose of turning on the third regulating device 19 is to reduce the temperature of the refrigerant so that it can absorb more heat from the cooling liquid flowing through the first heat exchange portion 71 in the second heat exchange portion 72, so as to achieve the purpose of dissipating heat for the motor or the battery. When the motor or the battery does not need to dissipate heat, the third regulating device 19 can be turned off to block the third branch 14. Or, when only part of the heat of the motor or the battery needs to be taken away, the third regulating device 19 is in a conducting mode and does not perform throttling, and the refrigerant flows to the second heat exchange portion 72 through the third branch 14. In the second heat exchange portion 72, the refrigerant exchanges heat with the cooling liquid in the first heat exchange portion 71, and absorbs the heat of the cooling liquid circulation flow path, so that the working temperature of the battery will not be too high or exceed the requirements in the high temperature environment in summer. Another path of the refrigerant enters the second indoor heat exchanger 5 after being throttled and cooled by the second regulating device 6. The second indoor heat exchanger 5 is used as an evaporator. The refrigerant exchanges heat with the air in the air duct 16 through the first indoor heat exchanger 5. The heat of the air is transferred to the refrigerant, and the air cools down and enters the vehicle compartment, which reduces the environment temperature in the vehicle compartment. Finally, after the two paths of the refrigerant are separated into gas and liquid by the gas-liquid separator 17, the refrigerant returns to the compressor 1 to be compressed again. It is cycled in this way.

In the first working mode: the first pump 21 of the cooling liquid circulation flow path is activated. The first heat exchange assembly 8, the first pump 21, the first flow regulating device 11, the first branch 10 and the first heat exchange portion 71 are communicated to form a loop. The first heat exchange assembly 8 transfers the heat of the battery to the cooling liquid. The cooling liquid flows in the flow path under the driving of the first pump 21. When the cooling liquid passes through the first heat exchange portion 71, it transfers heat to the refrigerant in the second heat exchange portion 72. Finally, the cooling liquid returns to the first heat exchange assembly 8 to absorb the heat of the battery again. This cycle is performed to achieve the purpose of dissipating heat for the battery. The second pump 20 is activated at the same time, the first control valve 22 is closed, or the fifth port 132, the sixth port 133 and the fourth port 131 of the second flow regulating device 13 are all not communicated; or the first port 111 and the second port 112 of the first flow regulating device 11 are not in communication with the third port 113, so that the cooling liquid does not pass through the second branch 12. The second control valve 25 and the third control valve 26 are both opened, and the second heat exchange assembly 9, the second heat exchanger 15, and the second pump 20 are communicated to form a loop. The second pump 20 drives the cooling liquid to flow, and brings the heat of the motor to the second heat exchanger 15. The second heat exchanger 15 exchanges heat with the external environment, so as to play a role in dissipating the heat of the motor.

In other embodiments, in the second working mode, the first heat exchange assembly 8, the first pump 21, the first flow regulating device 11, the second heat exchange assembly 9, the second flow regulating device 13, and the first heat exchange portion 71 are communicated to form a loop. The second control valve 25 is closed. The third control valve 26 is opened. The cooling liquid does not pass through the second heat exchanger 15. The second port 112 and the third port 113 of the first flow regulating device 11 are both in communication with the first port 111. After passing through the first heat exchange assembly 8, one path of the cooling liquid flows to the first branch 10 and another path of the cooling liquid flows to the second heat exchange assembly 9. The two branches of the cooling liquid merges and then flows to the first heat exchange portion 71. The heat of the cooling liquid circulation flow path is transferred to the refrigerant circulation flow path through the first heat exchanger/first dual-flow heat exchanger 7. The second pump 20 can be activated or deactivated. When it is deactivated, the second pump 20 is only used as a pipeline. The first control valve 22 may be closed or opened. When the first control valve 22 is opened and when the cooling liquid flows to the second branch 12, the motor and the battery are simultaneously dissipated, which can play a role in maintaining the normal working temperature of the motor. The principle is the same as the working principle of the cooling liquid circulation flow path in the heating mode. That is, the cooling liquid is distributed by the first flow regulating device 11 and the third flow regulating device 13, and the amount of heat transferred from the cooling liquid to the refrigerant is adjusted.

When the external environment temperature is low in winter, the surface of the outdoor heat exchanger 4 in the heating mode is likely to be frosted after long-term use, which affects its heat exchange performance. In the second working mode, the thermal management system can use the excess heat generated by the motor and the battery to actively defrost the outdoor heat exchanger 4. As shown in FIG. 3, thick solid line parts are the flow paths of the refrigerant, and the thin solid line parts are the flow paths of the cooling liquid. In the second working mode: the working principle of the refrigerant side is the same as the working principle of the refrigerant in the first working mode. The outdoor heat exchanger 4 is used as a condenser. When the refrigerant passes through the outdoor heat exchanger 4, it releases heat, and the frost on the surface of the outdoor heat exchanger 4 melts. In the cooling liquid circulation flow path, the first heat exchange assembly 8, the first pump 21, the first flow regulating device 11, the second heat exchange assembly 9, the second flow regulating device 13, and the first heat exchange portion 71 are communicated to form a loop. The second control valve 25 is closed. The cooling liquid does not pass through the second heat exchanger 15. The second port 112 and the third port 113 of the first flow regulating device 11 are both in communication with the first port 111. After passing through the first heat exchange assembly 8, one path of the cooling liquid flows to the first branch 10 and another path of the cooling liquid flows to the second heat exchange assembly 9. The two paths of the cooling liquid merge and then flow to the first heat exchange portion 71. The heat of the cooling liquid circulation flow path is transferred to the refrigerant circulation flow path through the first heat exchanger 7. The second pump 20 can be activated or deactivated. When the second pump 20 is deactivated, it is only used as a pipeline. The first control valve 22 may be closed or opened. When the first control valve 22 is opened and when the cooling liquid flows to the second branch 12, it can play a role in maintaining the normal working temperature of the motor while simultaneously dissipating heat of the motor and the battery. The principle of the cooling liquid circulation flow path is the same as the working principle of the cooling liquid circulation flow path in the heating mode. That is, the cooling liquid is distributed by the first flow regulating device 11 and the third flow regulating device 13, and the amount of heat transferred from the cooling liquid to the refrigerant is adjusted. It should be noted that during the defrosting process, the second indoor heat exchanger 5 is used as an evaporator, which will reduce the temperature of the air entering the vehicle compartment. Therefore, it is possible to choose to set a damper so that the air bypasses or does not pass through the second indoor heat exchanger 5, and the refrigerant in the second indoor heat exchanger 5 does not exchange heat.

In other embodiments, in the second working mode, the second regulating device 6 can also be controlled to be turned off. The refrigerant flows from the outdoor heat exchanger 4 to the third branch 14. The second indoor heat exchanger 5 does not work. Therefore, no cold wind will be blown into the vehicle compartment.

Figure 4:
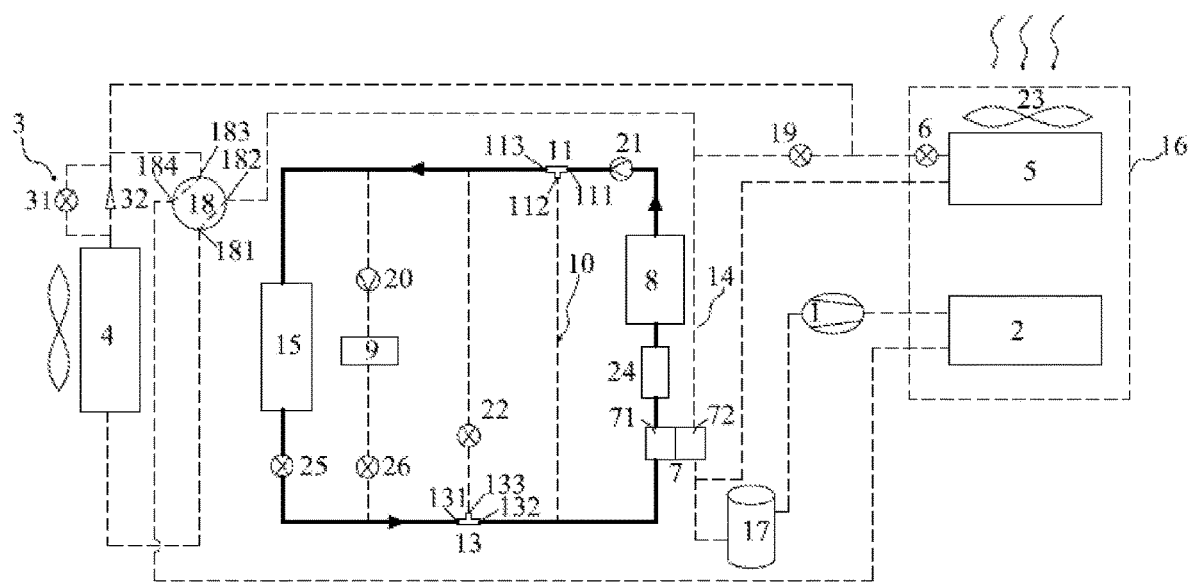
FIG. 4 is a schematic view of a principle of a heat dissipation mode of a battery in accordance with an exemplary embodiment of the present disclosure.

The first heat exchange assembly 8 includes a battery. In the process of battery charging or fast charging, the battery is prone to generate more heat. If the battery cannot dissipate the heat, there will be a safety hazard. The thermal management system further includes a battery cooling mode. As shown in FIG. 4, in the battery cooling mode: the refrigerant circulation flow path does not work; the first pump 21 is activated to drive the cooling liquid to flow in the pipeline; the second pump 20 does not work; the second control valve 25 is opened; both the first control valve 22 and the third control valve 26 are closed; the branch where the first control valve 22 and the third control valve 26 are located is not communicated; the first port 111 and the third port 113 of the first flow regulating device 11 are in communication; the second port 112 is closed; the first heat exchange assembly 8, the first pump 21, the first flow regulating device 11, the second heat exchanger 15, the second control valve 25, and the first heat exchange portion 71 are communicated to form a loop. The first heat exchange assembly 8 transfers the heat generated by the battery to the outside through the second heat exchanger 15. As a result, the battery can dissipate the heat during the charging process.

Figure 5:
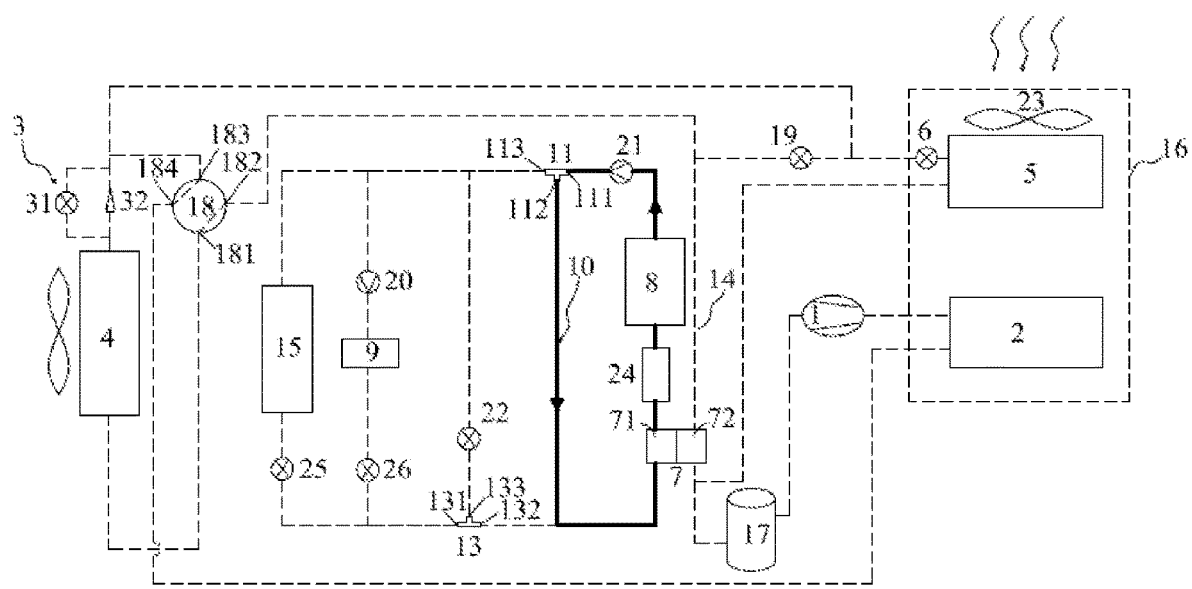
FIG. 5 is a schematic view of a principle of a heating mode of a battery in accordance with an exemplary embodiment of the disclosure.

As shown in FIG. 5, the cooling liquid circulation flow path further includes a heater 24. The first heat exchange assembly 8 further includes a battery. The thermal management system further includes a battery heating mode. In the battery heating mode, the compressor 1 does not work; the refrigerant circulation flow path is not communicated; the first control valve 22 is closed; the second control valve 25 is closed; the third control valve 26 is closed; correspondingly, the branches where the three valves are located are not communicated; the second pump 20 does not work; the first pump 21 is activated to drive the cooling liquid to flow; the first port 111 and the second port 112 of the first flow regulating device 11 are in communication; the third port 113 is closed; the first heat exchange portion 71, the heater 24, the first heat exchange assembly 8, the first pump 21, the first flow regulating device 11, and the first branch 10 are communicated to form a loop. The heater 24 may be an electric heater or a PTC heater, and is used to heat the cooling liquid flowing through the heater 24. For example, when the environment temperature is relatively low in winter, the working temperature of the battery needs to meet certain requirements before the vehicle starts, the heater 24 can be turned on to increase the temperature of the cooling liquid. When the cooling liquid flows through the first heat exchange assembly 8, it exchanges heat with the surrounding environment of the battery, and releases heat to increase the temperature of the surrounding environment of the battery. As a result, the battery is able to have a proper working temperature.

When the environment temperature is relatively low in winter, the thermal management system can perform the heating mode to heat the vehicle compartment. However, when the vehicle is just started, the cooling liquid temperature is relatively low. In the heating mode, the refrigerant absorbing the heat of the cooling liquid through the first heat exchanger 7 is relatively limited, and the heating effect of the thermal management system is not good or can not heat quickly. At this time, the thermal management system can turn on the heater 24 to actively heat the cooling liquid and provide heat to the refrigerant through the first heat exchanger 7. In this way, the thermal management system can not only provide heat to the refrigerant side so as to improve the heating effect through the heater 24, but also can be used to quickly heat the environment in the vehicle compartment, and can also preheat the battery and the motor. In this embodiment, the electric heater 24 is connected between the first heat exchange assembly 8 and the first heat exchange portion 71 to preheat the battery preferentially. In other embodiments, the heater 24 may be connected between the first heat exchange portion 71 and the first heat exchange assembly 8, or may be connected to the first branch 10. The position of the heater 24 can also be any position on the cooling liquid flow path in FIG. 5. It should be noted that in other modes, the heater 24 can be selected not to be turned on, and the heater 24 is only used as a conducting flow path.

What is claimed is:

1. A thermal management system, comprising: a cooling liquid circulation flow path and a refrigerant circulation flow path; the thermal management system comprising a first heat exchanger, the first heat exchanger comprising a first heat exchange portion and a second heat exchange portion which are capable of exchanging heat, a flow path of the first heat exchange portion being capable of communicating with the cooling liquid circulation flow path, a flow path of the second heat exchange portion being capable of communicating with the refrigerant circulation flow path, the cooling liquid circulation flow path comprising a first heat exchange assembly, a second heat exchange assembly and a first branch;

the thermal management system comprising a heating mode in which the refrigerant circulation flow path is communicated to form a loop; the first heat exchange assembly, the second heat exchange assembly and the first heat exchange portion being communicated to form a loop; the first heat exchange assembly, the first branch and the first heat exchange portion being communicated to form a loop; after the cooling liquid passing through the first heat exchange assembly, one path of the cooling liquid flowing to the first branch, and another path of the cooling liquid flowing to the second heat exchange assembly; the cooling liquid after flowing through the first branch and the cooling liquid after flowing through the second heat exchange assembly merging and then flowing to the first heat exchange portion, and heat of the cooling liquid circulation flow path being transferred to the refrigerant circulation flow path through the first heat exchanger;

wherein the refrigerant circulation flow path comprises a compressor, a first indoor heat exchanger, a first regulating device, an outdoor heat exchanger and a third branch; in the heating mode: the compressor, the first indoor heat exchanger, the first regulating device, the outdoor heat exchanger and the second heat exchange portion are communicated to form a loop; and the compressor, the first indoor heat exchanger, the third branch and the second heat exchange portion are communicated to form a loop, the refrigerant after flowing through the first indoor heat exchanger is divided, one path of the refrigerant flows to the third branch, and another path of the refrigerant flows to the first regulating device.

2. The thermal management system according to claim 1, wherein the first flow regulating device comprises a first port, a second port and a third port, the first port is capable of communicating with the first heat exchange assembly, the second port is capable of communicating with the first branch, and the third port is capable of communicating with the second heat exchange assembly;

in the heating mode: the second port and the third port are both in communication with the first port, and after the cooling liquid passing through the first heat exchange assembly, the cooling liquid is divided by the first flow regulating device.

3. The thermal management system according to claim 2, wherein the first flow regulating device is a proportional regulating valve.

4. The thermal management system according to claim 1, wherein the cooling liquid circulation flow path further comprises a second branch; in the heating mode: the second branch and the second heat exchange assembly are in communication to form a loop, after the cooling liquid passing through the second heat exchange assembly, one path of the cooling liquid flows to the second branch, and another path of the cooling liquid flows to the first heat exchange portion.

5. The thermal management system according to claim 4, wherein the cooling liquid circulation flow path comprises a second flow regulating device, the second flow regulating device comprises a fourth port, a fifth port and a sixth port, the fourth port is capable of communicating with the second heat exchange assembly, the fifth port is capable of communicating with the first heat exchange portion, and the sixth port is capable of communicating with the second branch;

in the heating mode: the fifth port and the sixth port are both in communication with the fourth port, and after the cooling liquid passing through the second heat exchange assembly, the cooling liquid is divided by the second flow regulating device.

6. The thermal management system according to claim 5, wherein the second flow regulating device is a proportional regulating valve.

7. The thermal management system according to claim 1, wherein the refrigerant circulation flow path further comprises a second indoor heat exchanger and a second regulating device;

the thermal management system further comprises a cooling mode; in the cooling mode: the compressor, the first indoor heat exchanger, the outdoor heat exchanger, the second regulating device and the second indoor heat exchanger are communicated to form a loop; and the compressor, the first indoor heat exchanger, the outdoor heat exchanger, the third branch and the second heat exchange portion are communicated to form a loop, the refrigerant after flowing through the outdoor heat exchanger is divided, one path of the refrigerant flows to the third branch, and another path of the refrigerant flows to the second indoor heat exchanger.

8. The thermal management system according to claim 7, wherein the refrigerant circulation flow path further comprises a flow path regulating device, the flow path regulating device comprises a first connection port, a second connection port, a third connection port and a fourth connection port, the first connection port is capable of communicating with the outdoor heat exchanger, the second connection port is capable of communicating with the second heat exchange portion, both the first regulating device and the third branch are capable of communicating with the third connection port, and the fourth connection port is capable of communicating with the second heat exchanger; the flow path regulating device comprises a first working state and a second working state, in the first working state, the first connection port is in communication with the second connection port, and the third connection port is in communication with the fourth connection port; in the second working state, the first connection port is in communication with the fourth connection port, the second connection port is not in communication with the third connection port; in the heating mode: the flow path regulating device is in the first working state; and in the cooling mode: the flow path regulating device is in the second working state.

9. The thermal management system according to claim 7, wherein the first regulating device is a combined valve, the first regulating device comprises a throttle unit valve and a conduction unit valve, the conduction unit valve is a check valve, and the throttle unit valve and the conduction unit valve are arranged in parallel;

in the heating mode: the throttle unit valve is opened, and the conduction unit valve is closed; and in the cooling mode: the throttle unit valve is closed, and the conduction unit valve is opened.

10. The thermal management system according to claim 7, wherein the refrigerant circulation flow path comprises a second regulating device connected on the third branch, the second regulating device is in a conducting state, or the second regulating device is in a throttling state, or the second regulating device is in a blocking state.

11. The thermal management system according to claim 7, wherein the cooling liquid circulation flow path further comprises a second heat exchanger, the cooling mode further comprises a first working mode,
in the first working mode: the first heat exchange assembly, the first branch and the first heat exchange portion are communicated to form a loop; and, the second heat exchange assembly and the second heat exchanger are communicated to form a loop, the second heat exchange assembly exchanges heat with an outside through the second heat exchanger.

12. The thermal management system according to claim 7, wherein the cooling mode comprises a second working mode, in the second working mode: the first heat exchange assembly, the second heat exchange assembly and the first heat exchange portion are communicated to form a loop, after the cooling liquid passing through the first heat exchange assembly, one path of the cooling liquid flows to the first branch and another path flows to the second heat exchange assembly, the one path and the another path of the cooling liquid merge and then flow to the first heat exchange portion, and heat of the cooling liquid circulation flow path is transferred to the refrigerant circulation flow path through the first heat exchanger.

13. The thermal management system according to claim 11, wherein the first heat exchange assembly comprises a battery, the thermal management system further comprises a battery heat dissipation mode, in the battery heat dissipation mode: the first heat exchange assembly, the second heat exchanger and the first heat exchange portion are communicated to form a loop, and the first heat exchange assembly transfers heat generated by the battery to the outside through the second heat exchanger.

14. The thermal management system according to claim 11, wherein the cooling liquid circulation flow path further comprises a heater, the first heat exchange assembly comprises a battery, the thermal management system further comprises a battery heating mode, in the battery heating mode: the first heat exchange portion, the heater, the first heat exchange assembly and the first branch are communicated to form a loop.

15. The thermal management system according to claim 11, wherein the refrigerant circulation flow path further comprises a gas-liquid separator, an outlet of the gas-liquid separator is capable of communicating with an inlet of the compressor, and an inlet of the gas-liquid separator is capable of communicating with at least one of an outlet of the second heat exchange portion and an outlet of the second indoor heat exchanger.

16. A thermal management system, comprising:
a refrigerant system comprising a compressor, a first indoor heat exchanger, a second indoor heat exchanger, an outdoor heat exchanger and a throttling device;
a cooling liquid system comprising a first pump, a first heat exchange assembly and a second heat exchange assembly;
a first dual-flow heat exchanger comprising a first heat exchange portion and a second heat exchange portion which are not communicated;

the thermal management system comprising a heating mode, and in the heating mode:
the refrigerant system communicating with the second heat exchange portion to form a refrigerant circuit, an outlet of the compressor being in communication with an inlet of the first indoor heat exchanger, an outlet of the first indoor heat exchanger being in communication with at least one of a first port of the outdoor heat exchanger and an inlet of the second heat exchange portion, an outlet of the second heat exchange portion being in communication with an inlet of the compressor, and a second port of the outdoor heat exchanger being in communication with the inlet of the compressor;
the throttling device being communicated between the outlet of the first indoor heat exchanger and the first port of the outdoor heat exchanger; and/or, the throttling device being communicated between the outlet of the first indoor heat exchanger and the inlet of the second heat exchange portion;
the cooling liquid system communicating with the first heat exchange portion to form a cooling liquid circuit, the cooling liquid system comprising a first branch, the first heat exchange assembly being in communication with a first pump, and at least one of the second heat exchange assembly and the first branch being in communication with the first pump and the first heat exchange portion.

17. The thermal management system according to claim 16, wherein the cooling liquid circulation flow path further comprises a first flow regulating device, the first flow regulating device is a three-way proportional regulating valve, the first flow regulating device comprises a first port, a second port and a third port, the first port is capable of communicating with the first heat exchange assembly, the second port is capable of communicating with the first branch, the third port is capable of communicating with the second heat exchange assembly;
in the heating mode: the second port and the third port are both in communication with the first port, and the cooling liquid after passing through the first heat exchange assembly is divided by the first flow regulating device.

18. The thermal management system according to claim 16, wherein the cooling liquid circulation flow path further comprises a second branch, in the heating mode: the second branch and the second heat exchange assembly are communicated to form a loop, after the cooling liquid passing through the second heat exchange assembly, one path of the cooling liquid flows to the second branch and another path of the cooling liquid flows to the first heat exchange portion.

19. A thermal management system, comprising:
a compressor, a first indoor heat exchanger, a second indoor heat exchanger, an outdoor heat exchanger, a first throttling device, a second throttling device;
a first pump, a first heat exchange assembly and a second heat exchange assembly;
a first dual-flow heat exchanger comprising a first heat exchange portion and a second heat exchange portion which are not communicated;
wherein the thermal management system comprises a heating mode, and in the heating mode:
an outlet of the compressor is in communication with an inlet of the first indoor heat exchanger, an outlet of the first indoor heat exchanger is in communication with at least one of a first port of the outdoor heat exchanger and an inlet of the second heat exchange portion, an outlet of the second heat exchange portion is in communication with an inlet of the compressor, a second port of the outdoor heat exchanger is in communication with the inlet of the compressor, the first throttling device is communicated between the outlet of the first indoor heat exchanger and the first port of the outdoor heat exchanger, the second throttling device is communicated between the outlet of the first indoor heat exchanger and the inlet of the second heat exchange portion;

the thermal management system further comprises a first branch, the first heat exchange assembly is in communication with a first pump, and at least one of the second heat exchange assembly and the first branch is in communication with the first pump and the first heat exchange portion.

* * * * *